(12) United States Patent
Ding et al.

(10) Patent No.: US 10,460,487 B2
(45) Date of Patent: Oct. 29, 2019

(54) AUTOMATIC IMAGE SYNTHESIS METHOD

(71) Applicant: Shanghai Xiaoyi Technoogy Co., Ltd., Shanghai (CN)

(72) Inventors: Dajun Ding, Shanghai (CN); Lili Zhao, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 192 days.

(21) Appl. No.: 15/205,082

(22) Filed: Jul. 8, 2016

(65) Prior Publication Data

US 2017/0372498 A1    Dec. 28, 2017

(30) Foreign Application Priority Data

Jun. 27, 2016  (CN) .......................... 2016 1 0481886

(51) Int. Cl.
| | |
|---|---|
| *G06T 11/60* | (2006.01) |
| *G06T 3/40* | (2006.01) |
| *G06T 5/50* | (2006.01) |
| *H04N 9/78* | (2006.01) |
| *G06K 9/46* | (2006.01) |
| *G06K 9/62* | (2006.01) |
| *G06T 7/11* | (2017.01) |
| *G06T 7/12* | (2017.01) |
| *G06T 7/194* | (2017.01) |

(52) U.S. Cl.
CPC ............ *G06T 11/60* (2013.01); *G06K 9/4604* (2013.01); *G06K 9/6202* (2013.01); *G06T 3/40* (2013.01); *G06T 5/50* (2013.01); *G06T 7/11* (2017.01); *G06T 7/12* (2017.01); *H04N 9/78* (2013.01); *G06T 7/194* (2017.01); *G06T 2200/28* (2013.01); *G06T 2207/10004* (2013.01); *G06T 2207/10016* (2013.01); *G06T 2207/20032* (2013.01); *G06T 2207/20216* (2013.01); *G06T 2207/20221* (2013.01); *G06T 2207/20224* (2013.01)

(58) Field of Classification Search
CPC . G06T 11/60; G06T 3/40; G06T 7/136; G06T 7/0081; G06T 7/0083; G06T 2207/10016; G06T 2207/20021; G06T 2207/30232; G06T 7/32; H04N 9/78; G06K 9/00771
See application file for complete search history.

(56) References Cited

U.S. PATENT DOCUMENTS

| | | | | |
|---|---|---|---|---|
| 6,335,985 | B1 * | 1/2002 | Sambonsugi | G06K 9/3241 382/190 |
| 2002/0051058 | A1 * | 5/2002 | Ito | G06K 9/00771 348/152 |

(Continued)

*Primary Examiner* — Jingge Wu
(74) *Attorney, Agent, or Firm* — Cantor Colburn LLP

(57) ABSTRACT

Methods and apparatus for automatically synthesizing images are disclosed. The methods may include receiving a plurality of input frames with a common background. The methods may also include determining a number of the input frames. The methods may also include selecting, based on the number, a method to detect foregrounds of the input frames. The methods may further include using the selected method to generate an output frame comprising a combination of a plurality of the foregrounds.

17 Claims, 11 Drawing Sheets

(56) References Cited

U.S. PATENT DOCUMENTS

| | | | | |
|---|---|---|---|---|
| 2004/0061795 | A1* | 4/2004 | Kondo | G06T 7/20 348/239 |
| 2008/0152193 | A1* | 6/2008 | Takamori | G08B 13/19608 382/103 |
| 2008/0166022 | A1* | 7/2008 | Hildreth | G06F 3/017 382/107 |
| 2009/0201382 | A1* | 8/2009 | Makino | H04N 5/2625 348/220.1 |
| 2010/0104004 | A1* | 4/2010 | Wadhwa | G06T 3/40 375/240.01 |
| 2011/0043699 | A1* | 2/2011 | Springett | G06K 9/00771 348/571 |
| 2011/0150282 | A1* | 6/2011 | Gupta | G06K 9/00771 382/103 |
| 2014/0002342 | A1* | 1/2014 | Fedorovskaya | G06F 17/30247 345/156 |
| 2015/0067321 | A1* | 3/2015 | Baek | H04N 5/23229 713/100 |
| 2015/0161773 | A1* | 6/2015 | Takahashi | H04N 5/2171 382/173 |
| 2015/0220789 | A1* | 8/2015 | Wood | G06K 9/00711 382/103 |
| 2015/0294158 | A1* | 10/2015 | Collins | G06K 9/00711 382/103 |
| 2016/0118080 | A1* | 4/2016 | Chen | G11B 27/28 386/344 |
| 2017/0094194 | A1* | 3/2017 | Adsumilli | H04N 5/272 |
| 2017/0352083 | A1* | 12/2017 | Ruck | G06N 5/022 |

* cited by examiner

ORIGINAL IMAGE

| 1 | | 3 | | 5 | | 7 | |
|---|---|---|---|---|---|---|---|
| | | | | | | | |
| 17 | | 19 | | 21 | | 23 | |
| | | | | | | | |

FIG. 4A

SAMPLING RESULT

| 1 | 3 | 5 | 7 |
|---|---|---|---|
| 17 | 19 | 21 | 23 |

FIG. 4B

AVERAGING RESULT

| (1,3, 17,19) | (5, 7, 21, 23) |
|---|---|

FIG. 4C

AUTOMATIC IMAGE SYNTHESIS METHOD

CROSS-REFERENCE TO RELATED APPLICATION

This application is based upon and claims priority from Chinese Patent Application No. 201610481886.5, filed on Jun. 27, 2016, the disclosure of which is expressly incorporated herein by reference in its entirety.

TECHNICAL FIELD

The present disclosure generally relates to image processing technology, and more specifically to an automatic image synthesis method.

BACKGROUND

In many commercial, industrial, and scientific applications, it is often desired to extract objects of interest from different image frames and combine these objects into one image frame.

For example, with the popularity of sports cameras and smart phone-based cameras, so-called "multiplicity photography" has been increasingly gaining attention. Specifically, to perform multiplicity photography, a person may take several photos of an object (e.g., the person herself) with the object appearing at different locations in a scene and/or in different postures. The person may then combine the images of the object into one photo. The resulting photo shows multiple images of the same object, which is fun to see and share with other people.

For another example, in sports reporting, a photographer may shoot multiple moments of an athlete's action (e.g., a slam-dunk) and then show the multiple moments in one photo. Also for example, a product designer may shoot different faces of a product, and then combine the multiple views of the product into one picture for comparison. For yet another example, a biochemist may record a video clip of a molecule swimming in a cell, and then use the video clip to generate an image showing the same molecule appearing at multiple locations inside the cell. This way, the biochemist can conveniently study the molecule's conformation change during the molecule's movement.

The disclosed methods and systems address one or more of the demands listed above.

SUMMARY

Consistent with one embodiment of the present disclosure, an image synthesis method is provided. The method may include receiving a plurality of input frames with a common background. The method may also include determining a number of the input frames. The method may also include selecting, based on the number, a method to detect foregrounds of the input frames. The method may further include using the selected method to generate an output frame comprising a combination of a plurality of the foregrounds.

Consistent with another embodiment of the present disclosure, a device for synthesizing images is provided. The device may include a memory storing instructions. The device may also include a processor configured to execute the instructions to: receive a plurality of input frames with a common background; determine a number of the input frames; select, based on the number, a method to detect foregrounds of the input frames; and use the selected method to generate an output frame comprising a combination of a plurality of the foregrounds.

Consistent with yet another embodiment of the present disclosure, a non-transitory computer-readable storage medium storing instructions for synthesizing images is provided. The instructions cause a processor to perform operations including: receiving a plurality of input frames with a common background; determining a number of the input frames; selecting, based on the number, a method to detect foregrounds of the input frames; and using the selected method to generate an output frame comprising a combination of a plurality of the foregrounds.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

FIGS. 4A-4C are schematic diagrams illustrating an implementation of the method of FIG. 3, according to an exemplary embodiment.

DETAILED DESCRIPTION

Figure 1:
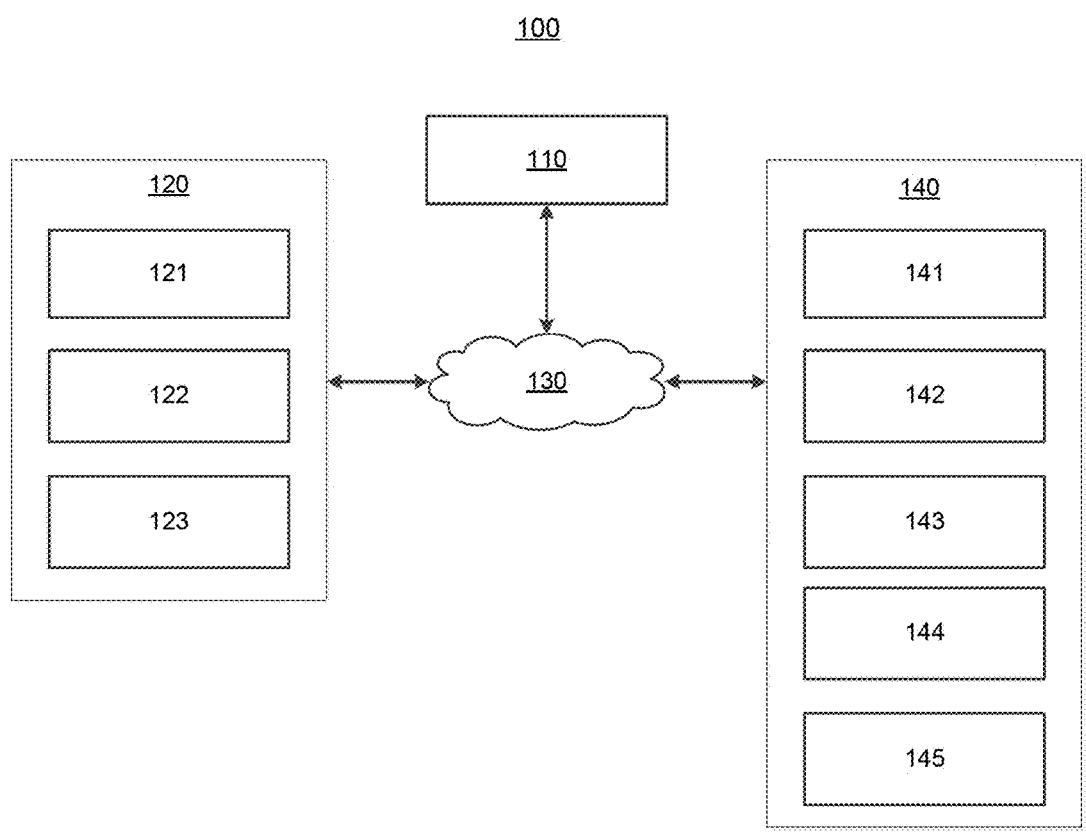
FIG. 1 is a block diagram of a system for synthesizing images, according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise noted. The implementations set forth in the following description of exemplary embodiments do not represent all implementations consistent with the invention.

Instead, they are merely examples of devices and methods consistent with aspects related to the invention as recited in the appended claims.

The present disclosure is directed to a method and system for automatically synthesizing images. "Synthesizing images" or "image synthesis" as used in this pressure refers to the technique of extracting an object (i.e., foreground) from multiple source frames and combining the extracted objects in a single output frame. The source frames may have the same background scene, but have the objects appearing at different locations in the background scene.

Image synthesis often requires a series of complicated manual operations. For example, one method requires a user to manually cut an object of interest from multiple source frames one by one, using techniques such as "Snakes" or "Graph Cut." The user then needs to paste the extracted objects on the same image frame. Such method requires the user to carefully recognize and extract the foreground of each source frame, and thus can be a tedious and error-prone task.

Another method synthesizes images from a short video clip. Specifically, the method assigns importance-based weights to different video frames and different pixels in each frame. The method then combines each video frame and pixel contribution differently based on the weights. This method may be convenient to use. However, when the objects from several video frames overlap spatially, the weighted combination may cause the overlapping region to have poor quality or look unreal. To solve this problem, the user often has to manually exclude one of more video frames from the combination process.

Yet another method uses the panoramic-photography features offered by many commercially available cameras, smart phones, applications, etc. Specifically, multiple source frames covering different parts of a scene may be shot and then stitched (i.e., joined together) to form a panorama. However, this method may be complicated and time-consuming to use. For example, if the user herself is the foreground that needs to be combined, the user has to constantly move around the scene, in order to appear in each source frame. Moreover, if two neighboring source frames are not well separated in space, the overlapping regions may have poor visual effect due to the disparity in image qualities and/or lighting conditions among the source frames.

The present disclosure provides a technical process to address one or more of the above-identified issues. In particular, the disclosed solution automatically extracts the foregrounds of multiple source frames and combines the extracted foregrounds in an output frame. Based on the number of source frames, the disclosed process may automatically choose a suitable method to detect the foregrounds and determine the position information of the foregrounds. Based on the position information, the disclosed process may automatically determine the amounts of overlap among the foregrounds and exclude from the combination process the foregrounds that cause a high degree of overlap. The disclosed process may then automatically combining the remaining foregrounds one by one in an output frame. As described below in more details, the disclosed process may eliminate the need of complicated manual operations and post-production processing, and thus improve the user experience. Moreover, the disclosed process executes rapidly and has a low computational load, and thus is suitable to be used in portable devices like smart phones.

FIG. 1 is a block diagram of a system 100 for synthesizing images, according to an exemplary embodiment. Referring to FIG. 1, system 100 includes a camera 110, a computing device 120, a network 130, and a user device 140.

Camera 110 is a device configured to capture an image frame, and may be a still camera, a video camera, or other imaging device. As used herein, an "image frame" can refer to, in part or in whole, a static or dynamic visual representation including, but not limited to, a photo, a picture, a graphic, a video frame, a hologram, a virtual reality image, an augmented reality image, other visual representations, or combinations thereof. Merely by way of example, camera 110 may be configured to capture an image frame with a native resolution of 1024×768, 3840×2160, 7680×4320, or other suitable resolutions.

For example, the camera may be a digital camera, an action camera, a web camera, a smartphone, a tablet, a laptop, a video gaming console equipped with a web camera, etc. Camera 110 may be configured to transmit the captured image frames to computing device 120 and/or user device 140 via network 130. In some embodiments, camera 110 may be configured to transmit a stream of image frames to computing device 120 and/or user device 140 in real time.

In some embodiments, camera 110 and computing device 120 may be packaged in a single device configured to perform functions of camera 110 and computing device 120 disclosed in this application. In some embodiments, camera 110 may also include one or more processors and memory configured to perform one or more methods described in this application. For example, camera 110 may be configured to generate multiple source frames containing the same object, and transmit the image frames to user device 140.

Computing device 120 may be configured to analyze the source frames received from camera 110. For example, computing device 120 may be configured to convert the source frames to a version with a lower resolution, for example, 426×240. Computing device 120 may also be configured to determine the number of source frames and choose, based on the number, a suitable foreground detection method to detect and extract foregrounds of the source frames. Computing device 120 may further be configured to generate an output frame containing some or all of the extracted foregrounds.

In some embodiments, computing device 120 may be a web camera, digital camera, a computer server, a desktop computer, a notebook computer, a tablet computer, a mobile phone, a personal digital assistant (PDA), or the like. Computing device 120 includes, among other things, a processor 121, memory 122, and communication port 123. In operation, processor 121 executes computer instructions (i.e., program code) and performs functions in accordance with techniques described herein. Computer instructions include routines, programs, objects, components, data structures, procedures, modules, and functions, which perform particular functions described herein.

For example, processor 121 may receive and analyze a plurality of source frames captured by camera 110, and detect the foregrounds of the source frames, as described elsewhere in this disclosure. Processor 121 may include or be part of one or more known processing devices such as, for example, a microprocessor. In some embodiments, processor 121 may include any type of single or multi-core processor, mobile device microcontroller, central processing unit, etc.

Memory 122 is configured to store one or more computer programs to be executed by processor 121 to perform exemplary functions disclosed herein. For example, memory 122 may be configured to store program(s) that may be executed by processor 121 to detect and extract the foregrounds of the source frames. Memory 122 may also be configured to store data and/or parameters used by processor 121 in methods described in this disclosure. For example, memory 122 may be used to store the position information of the extracted foregrounds. Processor 121 can access the position information and determine the degrees of overlap among the foregrounds based on the position information.

Memory 122 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 123 may be configured to transmit to and receive data from, among other devices, camera 110 and user device 140 over network 130. Network 130 may be any type of wired or wireless network that allows transmitting and receiving data. For example, network 130 may be a wired network, a local wireless network, (e.g., Bluetooth™, WiFi, near field communications (NFC), etc.), a cellular network, the Internet, or the like, or a combination thereof. Other known communication methods which provide a medium for transmitting data between separate are also contemplated.

User device 140 may be configured to receive data (e.g., image and/or video data) from camera 110 and/or computing device 120 via network 130. User device 140 is also configured to present images and/or video clips to the user. User device 140 is further configured to interact with the user for presenting images and/or video clips via its user interface (UI). For example, user device 140 may display the synthesized frame in a UI. In some embodiments, user device 140 may also display the source frames, so that the user may designate the foreground to be combined, and/or select a set of source frames for performing the image synthesis. For example, the UI may include a touch screen on which the user may select the source frames for image synthesis.

User device 140 may be any type of computing device. For example, user device 140 may be a smart phone, a tablet, a personal computer, a wearable device (e.g., Google Glass™ or smart watches, and/or affiliated components), or the like, or a combination thereof. In some embodiments, user device 140 and computing device 120 may together be included in a computing device configured to perform exemplary functions of user device 140 and computing device 120 disclosed in this application. User device 140 includes, among other things, a processor 141, a memory 142, a communication port 143, an input 144, and a display 145.

Processor 141 executes computer instructions (program code) and performs functions of user device 140 in accordance with techniques described herein. For example, processors 141 may be configured to perform the disclosed image synthesis methods. Processor 141 may also be configured to receive image data from computing device 120 and/or camera 110 via network 130. Processor 141 may also control display 145 to present image data in a UI. Processor 141 may further be configured to receive one or more inputs from the user via input 144, and control display 145 to present images and/or video clips in the UI based on the received input(s). Processor 141 may include or be part of one or more known processing devices such as, for example, a microprocessor. In some embodiments, processor 141 may include any type of single or multi-core processor, mobile device microcontroller, central processing unit, etc.

Memory 142 is configured to store one or more computer programs executed by processor 141 to perform exemplary functions of user device 140 disclosed in this application. For example, memory 140 may be configured to store program(s) that are executed by processor 141 to perform the disclosed image synthesis method. Memory 142 may also be configured to store program(s) for execution by processor 141 to control display 145 to present images and/or video clips. Memory 142 may also be configured to store data and/or parameters used by processor 141 in methods described in this disclosure. Memory 142 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 143 is configured to transmit data to and receive data from, among other devices, camera 110 and user device 140 over network 130. Input 144 is configured to receive inputs from the user and transmit the data/signal relating to the received inputs to processor 141 for further processing. For example, the user may use a touch screen (i.e., a part of input 144) to initiate an application for performing the disclosed image synthesis process. In response, input 144 transmits the data relating to the user's action to processor 141, which may then begin to process the source frames. Display 145 may be any device configured to display, among other things, images and/or video clips in the UI based on the display data fed by processor 141.

Figure 2:
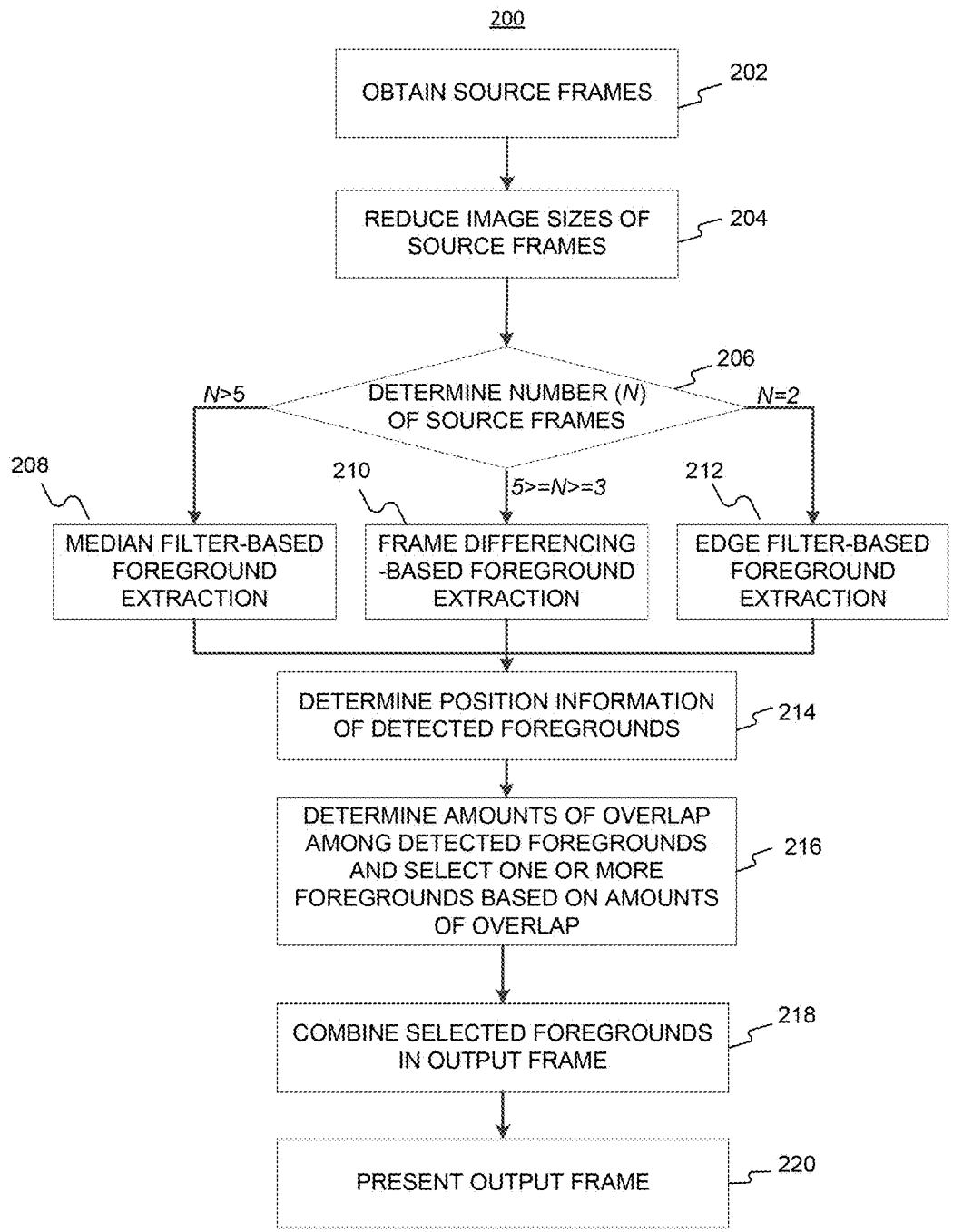
FIG. 2 is a flowchart of an image synthesis method, according to an exemplary embodiment.

FIG. 2 is a flowchart of an image synthesis method 200, according to an exemplary embodiment. Steps of method 200 may be performed by the same or different devices. In exemplary embodiments, method 200 may be performed by one or more of camera 110, computing device 120, and user device 140. For illustrative purpose only, the following description assumes that method 200 is performed by user device 140.

Referring to FIG. 2, method 200 may include the following steps. In step 202, user device 140 obtains a plurality of source frames. In one embodiment, user device 140 may be installed with an application for performing method 200. When the user activates the application via input 144, user device 140 may obtain a plurality of source frames in various methods. For example, user device 140 may be connected to camera 110 via network 130. Camera 110 may capture the source frames and transmit the source frames to user device 140 in real time. For another, the source frames may be pre-stored in memory 142. User device 140 may directly access memory 142 to retrieve the source frames.

Because it is desired to extract the foregrounds of the source frames and place them in the same output frame, the output frame and the source frames should cover the same background scene, i.e., contain the same background. Moreover, the source frames should have the same image sizes. In some embodiments, the source frames may be captured by fixing the imaging direction and the shooting parameters of camera 110, while changing the locations and/or postures of the object of interest, i.e., the foreground. For example, camera 110 may be placed on a tripod to avoid unwanted vibrations and movements, so that the captured source frames may contain exactly the same background.

In step 204, user device 140 reduces image sizes of the source frames.

Because the detection of a foreground concerns the pixel position of the foreground in a frame, not image details of the foreground, user device 140 may reduce the sizes (i.e., resolutions) of the source frames before performing the foreground detection. For example, if the source frames originally have a resolution of 3840×2160, user device 140 may reduce the resolution to 426×240. User device 140 may obtain pixel position information of the foregrounds based on the analysis of the lower-resolution source frames. User device 140 may then extract, from the higher-resolution (e.g., 3840×2160) source frames, the foregrounds according to the obtained pixel position information. In such a manner, computing requirement for performing the foreground detection can be reduced, while the quality of the synthesized images is not sacrificed.

Figure 3:
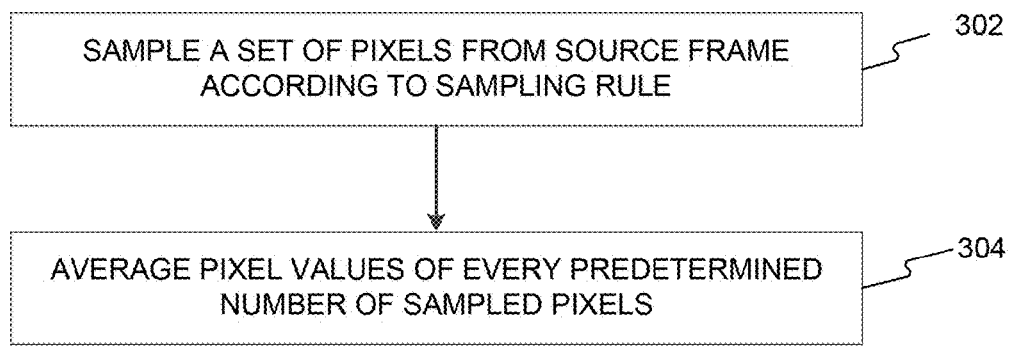
FIG. 3 is a flowchart of a method for reducing the image size of an image frame, according to an exemplary embodiment.

User device 140 may reduce the image sizes of the source frames using any suitable methods. For example, FIG. 3 is a flowchart of a method 300 for reducing the image size of a source frame, according to an exemplary embodiment. Referring to FIG. 3, method 300 may include the following steps 302-304.

In step 302, user device 140 samples a set of pixels from a source frame according to a sampling rule. The sampling rule may be, for example, "selecting every other pixel in both the column and row directions."

Each pixel has one or more pixel values indicating certain attributes of the pixel, such as luminance (i.e., brightness) and chrominance (i.e., color) of the pixel. For illustrative purpose only, the following description assumes the pixel value to be a greyscale value, with the lowest possible pixel value being 0 (black), and the maximum possible pixel value being 255 (white). The greyscale value indicates the luminance of the pixel.

FIGS. 4A-4C are schematic diagrams illustrating an implementation of method 300, according to an exemplary embodiment. FIG. 4A shows part of a source frame. Referring to FIG. 4A, each small square corresponds to a pixel. This part of the source frame includes 32 pixels. Each pixel is given a serial number. In the illustrated example, user device 140 selects every other pixel from the image. Thus, referring to FIG. 4B, 8 pixels are selected, namely, pixels 1, 3, 5, 7, 17, 19, 21, 23. In this manner, the size of the source frame is proportionally reduced.

In step 304, user device 140 averages the pixel values of every predetermined number of sampled pixels. For example, the predetermined number may be "4." Accordingly, user device 140 may group every four selected pixels together, and compute an arithmetic average of the pixel values of these four selected pixels. User device 140 may use the averaged pixel values to generate a reduced source frame.

Referring to FIG. 4C, user device 140 reduces the eight selected pixels to two pixels, by averaging the pixel values of original pixels 1, 3, 17, and 19, and averaging the pixels values of original pixels 5, 7, 21, and 23. Thus, there are two remaining pixels. Each remaining pixel has an averaged pixel value. In this manner, the size of the source frame is further reduced. It can be seen from FIGS. 4A-4C that the size of the reduced frame is determined by the number of selected pixels, not the size of the original source frame.

Method 300 reduces the number of pixels in the source frames by selectively sampling the pixels and then averaging the pixel values of the sampled pixels. This way, method 300 not only proportionally reduces the image size of the source frames, but also keeps the distinct pattern shown in the source frames. Although some texture details may be lost during the reduction, the texture differences between the foreground and background are preserved, allowing the detection of the foreground. Thus, using the reduced images in the disclosed motion determination method can reduce the computing workload, but still provide a reliable result.

Referring back to FIG. 2, in practice, step 204 is optional. Accordingly, the term "source frame" used in the following description may refer to either the original (i.e., native or higher resolution) source frames or the reduced (i.e., lower resolution) source frames. Unless in places where the different resolutions are critical to the implementation of the disclosure solution, the following description does not distinguish the original source frames from the reduced source frames.

In step 206, user device 140 determines N, the number of the source frames. When N>5, method 200 proceeds to step 208. When 5≥N≥3, method 200 proceeds to step 210. When N=2, method 200 proceeds to step 212.

In step 208, when N>5, user device 140 uses a median filter-based foreground detection method to detect and extract the foregrounds of the source frames.

Before detecting the foreground of each source frame, user device 140 needs to learn the background scene. A median filter may be applied to the source frames to obtain a reference frame that represents the background of the source frames. Specifically, for each pixel, the median filter takes the median of the pixel values of the corresponding pixels in the source frames. After a median pixel value is determined for each pixel, user device 140 may generate a background frame composed of the median pixel values.

Median is resistant to extreme values. Unless the foregrounds of the source frames completely overlap (i.e., have the same pixel positions), when the number of source frames are large enough, the extreme pixel values among all the pixel values associated with a pixel likely correspond to foregrounds. Thus, the median pixel values likely correspond to the background. Moreover, besides being resistant to pixel values corresponding to foregrounds, the median pixel values are also resistant to maximum noise fluctuations. Thus, in general, the more source frames are used, the more closely the median pixel value can represent the background. In practice, when N>5, the median filter may be considered as a reliable method for obtaining the background frame.

Figure 5:
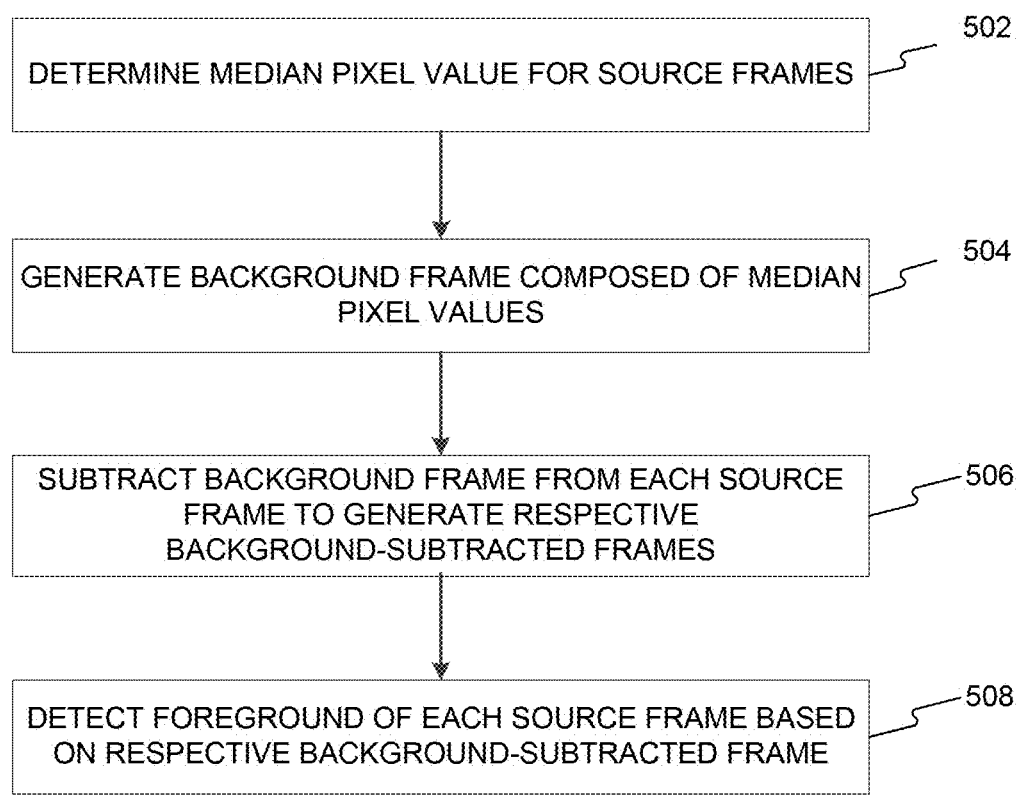
FIG. 5 is a flowchart of a median filter-based foreground detection method 500, according to an exemplary embodiment.

FIG. 5 is a flowchart of a median-filter based foreground detection method 500, according to an exemplary embodiment. Referring to FIG. 5, method 500 may include the following steps 502-508.

Figure 6:
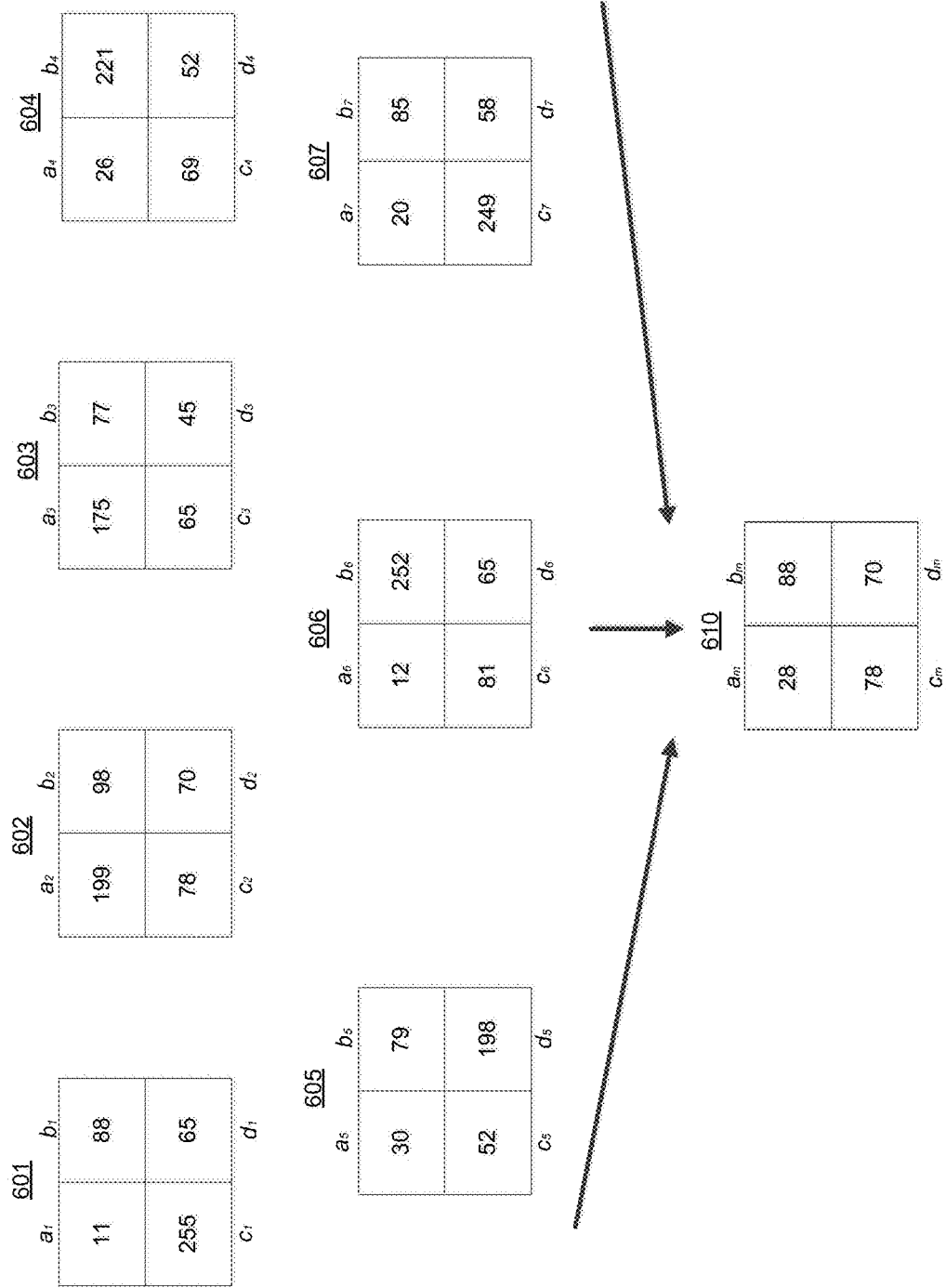
FIG. 6 is a schematic diagram illustrating an implementation of the method of FIG. 5, according to an exemplary embodiment.

In step 502, user device 140 determines the median pixel values for the source frames, in a manner to be described with respect to FIG. 6.

In step 504, user device 140 generates a background frame composed of the median pixel values.

FIG. 6 is a schematic diagram illustrating a median filter-based process to generate a background frame, according to an exemplary embodiment. For illustrative purpose only, the source frames in FIG. 2 are assumed to have a size of 2×2 pixels, labeled a, b, c, and d. As shown in FIG. 6, seven source frames 601-607 are represented as seven 2×2 matrices, with the number in each small square representing the pixel value of the corresponding pixel. User device 140 processes the pixel values of source frames 601-607 and constructs a 2×2 matrix, which constitutes a reference background frame 610.

Specifically, for each pixel $a_m$, $b_m$, $c_m$, and $d_m$, of reference background frame 610, user device 140 calculates a pixel value equal to the median of corresponding pixels of source frames 601-607. For example, the pixel value of upper-left pixel $a_m$ of reference background frame 610 is 28, the median of 11, 199, 175, 26, 30, 12, and 20, which are the pixel values of corresponding upper-left pixels $a_1$-$a_7$ of frames 601-607.

With continued reference to FIG. 6, although each of source frames 601-607 may contain a foreground, e.g., the pixel value 255 in source frame 601 and the pixel value 175 in source frame 603, the pixel values of the foregrounds are maximum values within the set of pixel values associated with each pixel and therefore are filtered by the median filter. The resulted background frame 610 does not contain any pixel values corresponding to the foregrounds.

Steps 502-504 may be represented by Eq. 1:

$$BG=\text{Median}(I_1, \ldots, I_i, \ldots, I_N) \quad \text{Eq. 1}$$

where "BG" stands for the background frame and "1;" stands for the source frames.

In step 506, user device 140 subtracts the background frame from each source frame to generate respective background-subtracted frames.

To perform background subtraction for a source frame, user device 140 may compute the absolute value differences between the pixel values in the source frame and the corresponding pixel values in the background frame. The absolute differences are values between 0-255 and thus form a greyscale frame. User device 140 may then convert the absolute differences into binary values.

Specifically, user device 140 may compare the absolute value differences with a predetermined threshold. User device 140 may then convert the absolute value differences greater than or equal to the predetermined threshold into a first value, e.g., value "1." User device may also convert the absolute value difference smaller than the predetermined threshold to a second value, e.g., value "0." The resulted binary values form a binary frame. Such binary conversion can eliminate noise in the pixel values. Moreover, if the foreground corresponds to a moving object, the binary conversion can eliminate the shadows caused by the moving object. User device 140 may treat the binary frame as the background-subtracted frame for the respective source frame.

In step 508, user device 140 detects the foreground of each source frame based on the respective background-subtracted frame.

The background-subtracted frame presents a good separation of the foreground from the background. For example, in the background-subtracted frame, user device 140 may consider the pixels with the value 0 to be the background and the pixels with the value 1 to be the foreground. This way, user device 140 may detect the foreground of each source frame.

Steps 506-508 may be represented by Eq. 2:

$$F_i=\text{Difference}(I_i, BG) \quad \text{Eq. 2}$$

where "$F_i$" stands for the foreground detected from the difference frames.

In step 210 (FIG. 2), when 5≥N≥3, user device 140 uses a frame differencing-based foreground detection method to detect and extract the foregrounds of the source frames.

Figure 7:
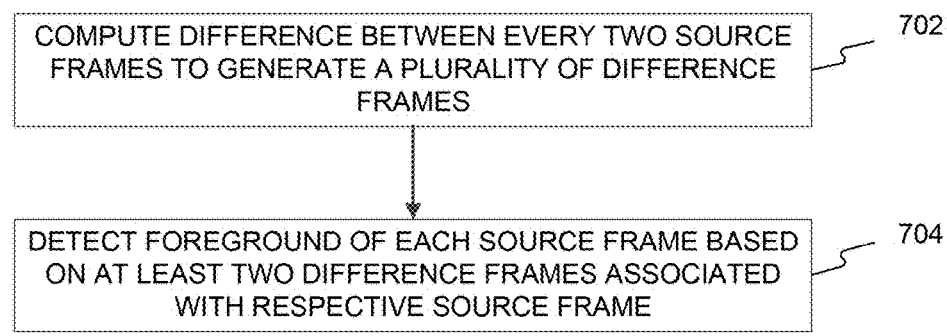
FIG. 7 is a flowchart of a frame differencing-based foreground detection method, according to an exemplary embodiment.

FIG. 7 is a flowchart of a frame differencing-based foreground detection method 700, according to an exemplary embodiment. Referring to FIG. 7, method 700 may include the following steps 702-704.

In step 702, user device 140 computes the difference between every two source frames to generate a plurality of difference frames.

Step 702 may be implemented in a way similar to step 506 (method 500 in FIG. 5). Specifically, user device 140 may first compute pixel-by-pixel absolute value differences between two source frames. User device 140 may then compare the absolute value differences to a predetermined threshold, and convert each absolute value difference into a binary value. The difference frame obtained in this manner is a binary frame. For example, in each difference frame, user device 140 may treat the pixels with the Value 0 to be the background and the pixels with the value 1 to be the foreground.

Step 702 may be represented by Eq. 3:

$$D_{ij}=\text{Difference}(I_i, I_j) \quad \text{Eq. 3}$$

where "$D_{ij}$" stands for the difference frame generated from source frames $1_i$ and $1_j$.

In step 704, user device 140 detects the foreground of each source frame based on at least two difference frames associated with the source frame.

Difference frame $D_{ij}$ contains both the foreground of source frame and the foreground of source frames $I_j$, but does not tell the corresponding relationships between the foregrounds and the source frames. To determine the corresponding relationships, user device 140 may use another difference frame such as $D_{ik}$, computed from the source frames $I_i$ and $I_k$. Difference frame $D_{ik}$ contains both the foreground of source frame $I_i$ and the foreground of source frames $I_k$. Thus, the common foreground of $D_{ij}$ and $D_{ik}$ is the foreground of source frame $I_i$. That is, user device 140 may detect the overlap between the foreground in $D_{ij}$ and the foreground in $D_{ik}$, and treats the overlapping portion of the foregrounds to be the foreground of source frame $I_i$. User device 140 may also detect the pixel positions of the overlap portion and use them as the pixel positions for foreground of source frame $I_i$.

The above-described process may be represented by Eq. 4:

$$F_i=\text{Common}(D_{ij}, D_{ik}) \quad \text{Eq. 4}$$

In some embodiments, user device 140 may use more than two difference frames associated with source frame $I_i$ to determine the foreground $F_i$, to achieve higher accuracy of detection.

As an illustration for the implementation of method 700, if three source frames are used, user device 140 may first generate three difference frames according to the following Eqs. 5:

$$D_{12}=\text{Difference}(l_1, l_2)$$

$$D_{23}=\text{Difference}(l_2, l_3)$$

$$D_{31}=\text{Difference}(l_3, l_1) \quad \text{Eqs. 5}$$

User device 140 may then determine the foreground of each source frame according to the following Eqs. 6:

$$F_1=\text{Common}(D_{12}, D_{31})$$

$$F_2=\text{Common}(D_{12}, D_{23})$$

$$F_3=\text{Common}(D_{13}, D_{31}) \quad \text{Eqs. 6}$$

As illustrated by this example, method 700 is applicable to situations where more than two source frames are used. In practice, when 5≥N≥3, median filter-based foreground detection method (e.g., method 300) may not be suitable because of the small number of source frames, but frame differencing-based foreground detection method (e.g., method 700) can provide good results.

In step 212 (FIG. 2), when N=2, user device 140 uses an edge filter-based foreground detection method to detect and extract the foregrounds of the source frames.

Two source frames can only be used to generate one difference frame. Thus, as discussed in step 704 (FIG. 7), user device 140 cannot ascertain the corresponding relationships between the foregrounds shown in the difference frame and the respective source frames. This difficulty can be further illustrated in FIG. 8.

Figure 8:
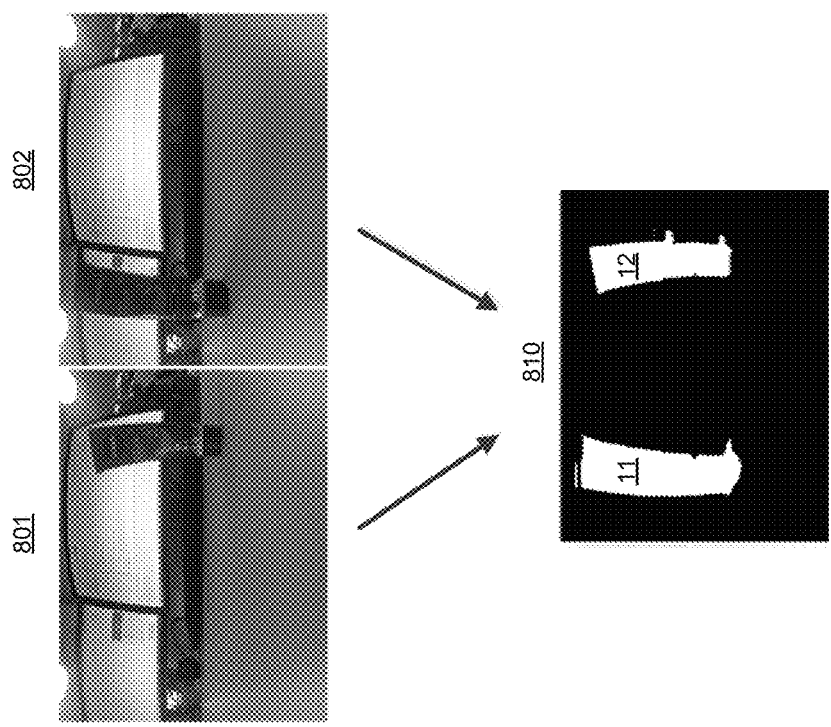
FIG. 8 is a schematic illustration of a frame differencing process as applied to two image frames, according to an exemplary embodiment.

FIG. 8 is a schematic illustration about a frame differencing process as applied to two source frames. Referring to FIG. 8, when only two source frames 801 and 802 are available, user device 140 may compute a difference frame 810 based on source frames 801 and 802. Difference frame 810 may contain two foregrounds 11 and 12 (i.e., the two white-color regions). Traditionally, the user has to manually determine and set the corresponding relationships between the foregrounds and the source frames. In order to minimize user input, the present disclosure provides an automatically implemented method to determine the corresponding relationships.

Figure 9:
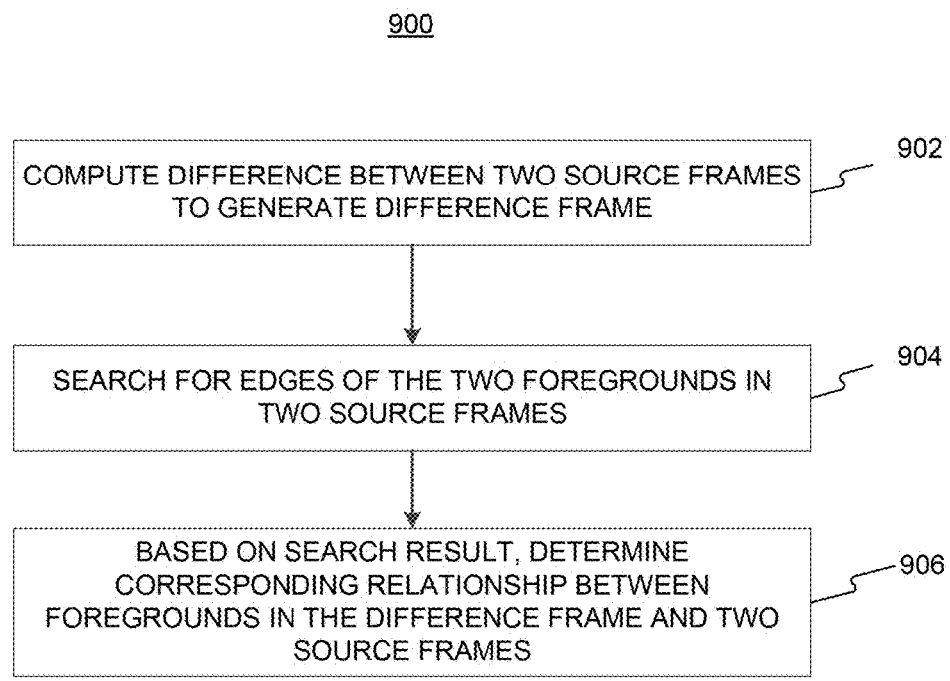
FIG. 9 is a flowchart of an edge filter-based foreground detection method 900, according to an exemplary embodiment.

FIG. 9 is a flowchart of an edge filter-based foreground detection method 900, according to an exemplary embodiment. For example, method 900 may be used when only two source frames are available for image synthesis. Referring to FIG. 9, method 900 may include the following steps.

In step 902, user device 140 computes the difference between the two source frames to generate a difference frame. The implementation of step 902 is similar to step 702 (method 700 in FIG. 7). The difference frame may include two foregrounds, each of which corresponds to one of the two source frames. The two foregrounds may be well separated from each other, like foregrounds 11 and 12 in difference frame 810 (FIG. 8). The two foregrounds may also have some overlap. In that case, the overlapping area may be shown as a black-color region that is between the two white-color regions In step 904, user device 140 searches for edges of the two foregrounds in the two source frames. Since the background and foreground in a source frame usually have distinct brightness and color, lines of points (i.e., edges) in the source frame where discontinuities occur, such as a sharp change in color or brightness, may correspond to the borders of a foreground. User device 140 may use an edge filter, such as a Laplacian filter, a Sobel filter, and a Canny edge filter, to detect whether and where an image frame contains edges.

In each of the two source frames, user device 140 may run the edge filter in a region corresponding to the edges of the two foregrounds in the difference frame. That is, user device 140 does not need to run the edge filter over the entire source image, and thus can save the computation time.

Based on the search result of step 904, user device 140 determines at step 906 a corresponding relationship between the foregrounds in the difference frames and the two source frames.

Referring to the example shown in FIG. 8, when user device 140 runs the edge filter in source frames 801 and 802 to detect foreground 11, the value returned from source frame 802 may be higher than the value return from source frame 801. Accordingly, user device 140 may determine that foreground 11 belongs to source frame 802. Similarly, when user device 140 runs the edge filter to detect foreground 12, the value returned from source frame 801 may be higher than the value return from source frame 802. Accordingly, user device 140 may determine that foreground 12 belongs to source frame 801.

After the corresponding relationships between the foregrounds 11, 12 and the source frames 801, 802 are determined, user device 140 may easily manipulate the source frames to generate a background frame or a frames showing both foregrounds 11, 12.

Figure 10:
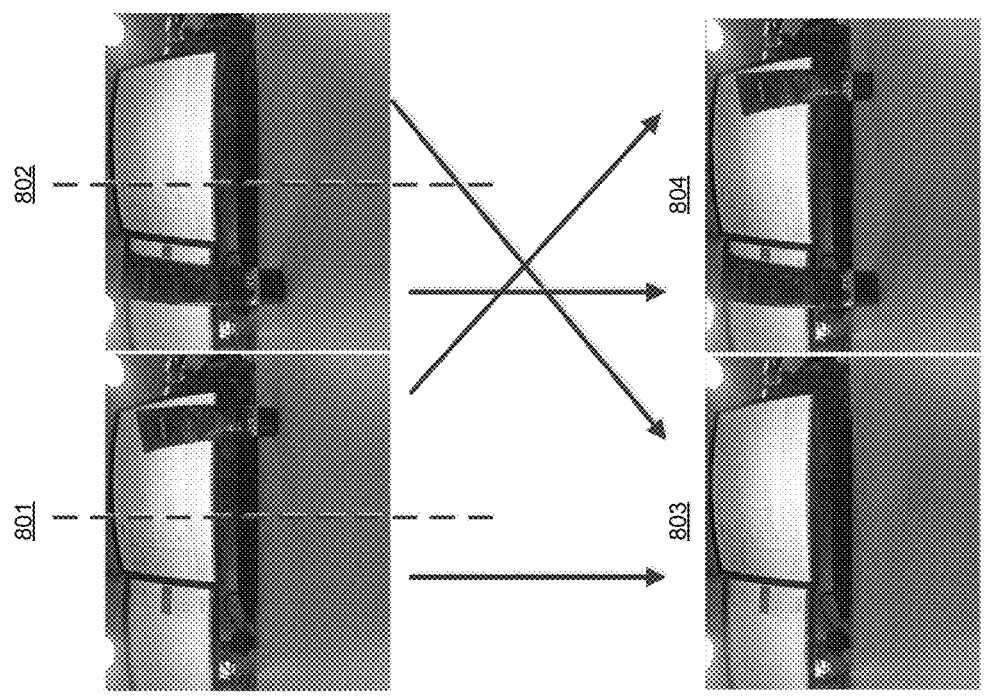
FIG. 10 is a schematic illustration of background and foreground generation, according to an exemplary embodiment.

FIG. 10 is a schematic illustration about background and foreground generation. Referring to FIG. 10, based on the corresponding relationships, user device 140 may determine that foreground 11 is on the left side of source frame 802, and foreground 12 is on the right side of source frame 801. Accordingly, user device 140 may combine the left side of source frame 801 and the right side of source frame 802 to generate a frame 803 showing only the background. Similarly, user device 140 may combine the right side of source frame 801 and the left side of source frame 802 to generate a frame 804 showing the foregrounds of source frames 801 and 802.

Referring back to FIG. 2, in step 214 user device 140 determines position information of the detected foregrounds.

After the foregrounds are detected, user device 140 may extract the foregrounds in "blobs." Blobs are regions on the binary frames (i.e., the binary frames generated in steps 208-212) that correspond to the foregrounds. User device 140 may perform blob analysis to determine features of the blobs, such as areas (i.e., number of pixels composing the blobs), perimeter, positions, and shapes of the blobs.

In step 216, user device 140 determines amounts of overlap among the detected foregrounds and selects one or more foregrounds based on the amounts of overlap.

User device 140 may determine the amounts of overlap based on the position information of the detected foregrounds. Specifically, during the blob analysis, user device 140 may study the connected pixels in the blobs and identify the largest connected component for each detected foreground. User device 140 may then determine the pixel coordinates of the starting points and ending points of the largest connected component. Based on these coordinates, user device 140 may further determine whether two detected foregrounds overlap and estimate how much they overlap.

User device 140 may exclude from the image combination the foregrounds that cause large amounts of overlap, so as to improve the image quality of the output frame. In one embodiment, when user device 140 determines that foregrounds $F_1$ and $F_2$ have a large overlap area, user device 140 may further determine whether $F_1$ and $F_2$ overlap with other foregrounds, to determine the respective overall degrees of overlap for $F_1$ and $F_2$. If $F_1$ has a higher overall degree of overlap than $F_2$, user device 140 may exclude $F_1$ from the image combination, but keep $F_2$ for combination.

In another embodiment, user device 140 may also determine the percentage of each foreground that overlaps with the remaining foregrounds. If the percentage of a foreground is higher than a predetermined threshold, user device 140 may exclude the foreground from the combination process.

In another embodiment, user device 140 may select the foregrounds to be combined based on their foreground image sizes. For example, even if the foregrounds do not overlap, user device 140 may still exclude a foreground from the combination process if the ratio of the foreground's image size over size of the output frame is higher than a predetermined threshold. In some cases, due to errors of the foreground detection, even if the detection result suggests that two foregrounds do not overlap, the two foregrounds may actually overlap when combined in an output frame. By eliminating large-sized foregrounds, user device 140 may reduce the "crowdedness" of the output frame and ensure no overlap occurs in the output frame. In some cases, due to errors of the foreground detection, even the detection result shows that foregrounds do not appear to over, the foregrounds do actually overlap In step 218, user device 140 combines the selected foregrounds in an output frame. User device 140 may combine the selected foregrounds one by one in a specified sequence. For example, user device 140 may determine the sequence based on image positions of the foregrounds. Specifically, user device 140 may find the center of each foreground or the blobs that correspond to the foreground, and determine the pixel coordinates of the center. Based on the center positions, user device 140 may determine the relative positions of the selected foregrounds. User device 140 may then, for example, insert the selected foregrounds into the output frame from the left to the right.

In step 220, user device 140 presents the output frame. For example, user device 140 may display the output frame in display 145. User device 140 may also send the output frame, via communication port 143, to other devices, so that the user can share the output frame with other people.

Figure 11C:
FIGS. 11A-11D illustrate exemplary results achieved using the disclosed methods.
Figure 11D:
Figure 11A:
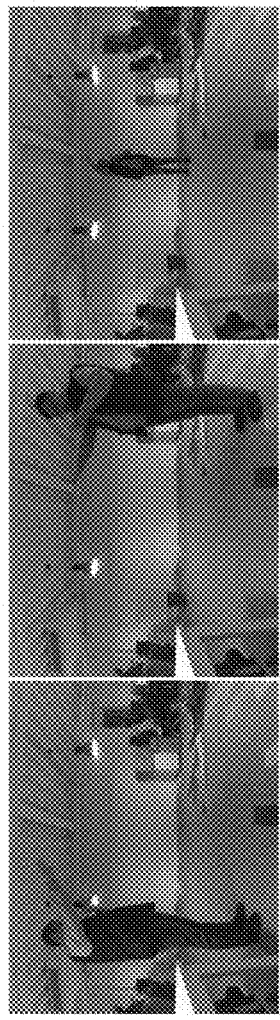
Figure 11B:

FIGS. 11A-11D illustrate exemplary results achieved using the disclosed methods. FIG. 11A shows three source frames 1101-1103. Thus, the frame differencing-based foreground detection method is used to detect the foregrounds. FIG. 11B shows three binary frames 1111-1113, containing the foregrounds of source frames 1101-1103 respectively. FIG. 11C shows a background frame 1121, generated based on the detected foregrounds. FIG. 11D shows an output frame 1131, containing the three detected foregrounds.

Method 200 provides a reliable, convenient, and fast solution to synthesize multiple foregrounds in an output frames. In particular, based on the number of input images, method 200 employs suitable ways to detect the foregrounds. The median filter-based foreground detection method can reliably provide the background when there are a large number of input frames. The frame differencing-based foreground detection method, although less efficient than the median filter-based method, can provide reliable results when the number of input frames is small. When only two input frames are used, the edge filter-based foreground detection method can provide a quick determination of the foregrounds. Moreover, all the three methods may be used on frames with reduced resolutions, so as to further increase the processing speed. Further, method 200 selects the foregrounds for combination based on the actual and/or potential amounts of overlaps among the foregrounds. This way, the image quality may be further improved.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact constructions that are described above and illustrated in the accompanying drawings, and that various modifications and changes can be made without departing from the scope thereof. It is intended that the scope of the invention should only be limited by the appended claims.

What is claimed is:

1. An image synthesis method, comprising:
receiving a plurality of input frames with a common background;
determining a number of the input frames;
selecting, based on the number, a method to detect foregrounds of the input frames; and
using the selected method to generate an output frame comprising a combination of a plurality of the foregrounds,
wherein generating an output frame comprising a combination of a plurality of the foregrounds comprises:
determining image positions of the foregrounds;
determining, based on the image positions, amounts of overlap among the foregrounds; and
selecting the foregrounds for the combination, based on the amounts of overlap;
wherein determining the amounts of overlap comprises:
determining a percentage of a first one of the foregrounds that overlaps with other ones of the foregrounds; and
selecting the one or more foregrounds for the combination comprises:
when the percentage is higher than a second predetermined threshold, excluding the first foreground from the combination.

2. The method of claim 1, wherein using the method to detect the foregrounds comprises:
when the number of input frames is greater than a first predetermined threshold, determining median pixel values of corresponding pixels of the input frames;
generating a background frame comprising pixels having the median pixel values;
subtracting the background frame from the input frames to generate respective difference frames; and
detecting the foregrounds of the input frames based on the difference frames.

3. The method of claim 2, wherein the first predetermined threshold is equal to 6.

4. The method of claim 1, wherein using the method to detect the foregrounds comprises:
when the number of input frames is less than 6 but greater than 2, generating a first difference frame based on a first input frame and a second input frame, the first difference frame including a first region representing a foreground;
generating a second difference frame based on the first input frame and a third input frame, the second difference frame including a second region representing a foreground; and
determining a common portion of the first and second region as a foreground of the first input frame.

5. The method of claim 1, wherein using the method to detect the foregrounds comprises:
when the number of input frames is equal to 2, generating a difference frame based on the two input frames;
determining a foreground in the difference frame;
determining whether an edge of the foreground is present in the two input frames; and
when it is determined that a first input frame includes at least part of the edge, determining that the foreground is a foreground of the first input frame.

6. The method of claim 5, wherein determining whether the edge of the foreground is present in the two input frames comprises:
running an edge filter in regions of the two input frames that encompass the edge, the edge filter returning a first value in the first input frame and a second value in the second input frame;
comparing the first and second values; and
when the first value is greater than the second value, determining that the first input frame includes at least part of the edge.

7. The method of claim 1, wherein generating an output frame comprising a combination of one or more foregrounds comprises:
   determining image sizes of the foregrounds; and
   selecting the foregrounds for the combination, based on the image sizes.

8. The method of claim 1, wherein generating an output frame comprising a combination of a plurality of the foregrounds:
   determining image positions of the detected foregrounds;
   determining a sequence based on the image positions; and
   combining the detected foregrounds according to the sequence.

9. The method of claim 1, wherein using the selected method to detect the foregrounds comprises:
   reducing image sizes of the input frames to generate reduced frames; and
   detecting the foregrounds based on the reduced frames.

10. A device, comprising:
    a memory storing instructions; and
    a processor configured to execute the instructions to:
      receive a plurality of input frames with a common background;
      determine a number of the input frames;
      select, based on the number, a method to detect foregrounds of the input frames; and
      use the selected method to generate an output frame comprising a combination of a plurality of the foregrounds,
    wherein the processor is further configured to execute the instructions to:
      determining a percentage of a first one of the foregrounds that overlaps with other ones of the foregrounds; and
      when the percentage is higher than a second predetermined threshold, excluding the first foreground from the combination.

11. The device of claim 10, wherein the processor is further configured to execute the instructions to:
    when the number of input frames is greater than a first predetermined threshold, determine median pixel values of corresponding pixels of the input frames;
    generate a background frame comprising pixels having the median pixel values;
    subtract the background frame from the input frames to generate respective difference frames; and
    detect the foregrounds of the input frames based on the difference frames.

12. The device of claim 10, wherein the processor is further configured to execute the instructions to:
    when the number of input frames is less than 6 but greater than 2, generate a first difference frame based on a first input frame and a second input frame, the first difference frame including a first region representing a foreground;
    generate a second difference frame based on the first input frame and a third input frame, the second difference frame including a second region representing a foreground; and
    determine a common portion of the first and second region as a foreground of the first input frame.

13. The device of claim 10, wherein the processor is further configured to execute the instructions to:
    when the number of input frames is equal to 2, generate a difference frame based on the two input frames;
    determine a foreground in the difference frame;
    determine whether an edge of the foreground is present in the two input frames; and
    when it is determined that a first input frame includes at least part of the edge, determine that the foreground is a foreground of the first input frame.

14. The device of claim 13, wherein the processor is further configured to execute the instructions to:
    run an edge filter in regions of the two input frames that encompass the edge, the edge filter returning a first value in the first input frame and a second value in the second input frame;
    compare the first and second values; and
    when the first value is greater than the second value, determine that the first input frame includes at least part of the edge.

15. The device of claim 10, wherein the processor is further configured to execute the instructions to:
    determine image positions of the foregrounds;
    determine, based on the image positions, amounts of overlap among the foregrounds; and
    select the foregrounds for the combination, based on the amounts of overlap.

16. The device of claim 10, wherein the processor is further configured to execute the instructions to:
    determining image sizes of the foregrounds; and
    selecting the foregrounds for the combination, based on the image sizes.

17. A non-transitory computer-readable storage medium storing instructions that, when executed by a processor of a device, cause the processor to perform an image-synthesis method, the method comprising:
    receiving a plurality of input frames with a common background;
    determining a number of the input frames;
    selecting, based on the number, a method to detect foregrounds of the input frames; and
    using the selected method to generate an output frame comprising a combination of a plurality of the foregrounds,
    wherein generating an output frame comprising a combination of a plurality of the foregrounds comprises:
    determining image positions of the foregrounds;
    determining, based on the image positions, amounts of overlap among the foregrounds; and
    selecting the foregrounds for the combination, based on the amounts of overlap;
    wherein determining the amounts of overlap comprises:
    determining a percentage of a first one of the foregrounds that overlaps with other ones of the foregrounds; and
    selecting the one or more foregrounds for the combination comprises:
    when the percentage is higher than a second predetermined threshold, excluding the first foreground from the combination.

* * * * *